United States Patent [19]
Gardner et al.

[11] 3,777,856
[45] Dec. 11, 1973

[54] ROVING COUNTER AND BRAKE

[75] Inventors: Charles R. Gardner, Glendale; David W. Goelz, Burbank, both of Calif.

[73] Assignee: Republic Corporation, Los Angeles, Calif.

[22] Filed: Oct. 6, 1971

[21] Appl. No.: 186,920

[52] U.S. Cl. ......... 188/65.1, 24/134 R, 24/134 KB, 24/133, 182/5, 254/156
[51] Int. Cl. ............................................. B65h 59/16
[58] Field of Search ................... 188/65.1; 254/156; 24/134 KA, 134 KC, 134 KD, 134 KB, 134 L, 133, 132 JB, 134 R; 182/5, 6, 7

[56] References Cited
UNITED STATES PATENTS

| | | | |
|---|---|---|---|
| 2,723,457 | 11/1955 | Wasilewski | 24/134 K |
| 598,776 | 2/1898 | Gosnell et al. | 188/65.1 |
| 476,969 | 6/1892 | Warner et al. | 24/133 X |
| 3,112,816 | 12/1963 | Halford | 24/134 K X |
| 2,136,457 | 11/1938 | Hixon | 33/134 R |
| 3,146,754 | 9/1964 | Ohnsman | 188/65.1 X |

*Primary Examiner*—George E. A. Halvosa
*Attorney*—Johnson, Root, O'Keefe, Keil, Thompson & Shurtleff

[57] ABSTRACT

A braking and counting arrangement for roving which includes a pawl responsive to the amount of tension in the roving; a wheel coupled to a counter mechanism; and guide members arranged to position the roving between the pawl and the wheel. When tension is applied to the roving, the roving moves freely and engages the wheel which rotate and allows the counter to register the amount of roving used. When tension is released from the roving, the pawl is urged against the roving and the wheel, thus restraining further movement of the roving and the wheel.

5 Claims, 9 Drawing Figures

PATENTED DEC 11 1973

INVENTORS
CHARLES R. GARDNER
DAVID W. GOELZ

BY Johnston, Root, O'Keeffe,
Keil, Thompson & Shurtleff
ATTORNEYS

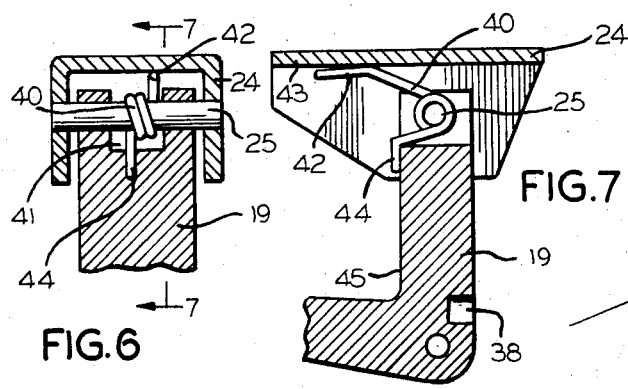
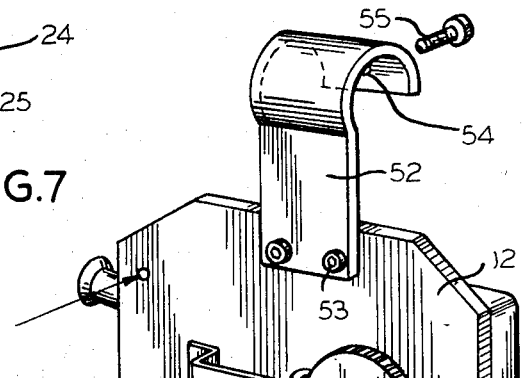
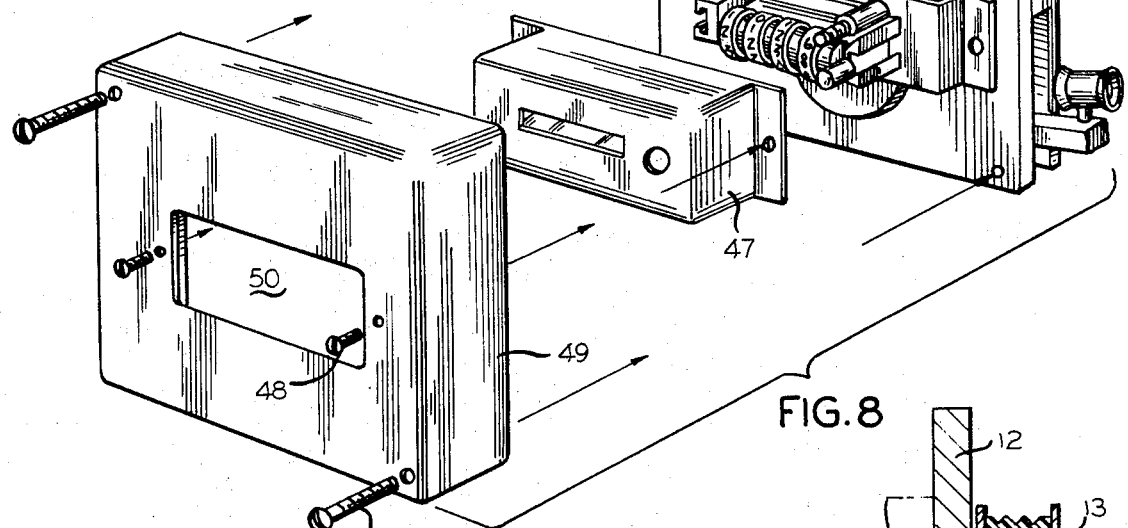
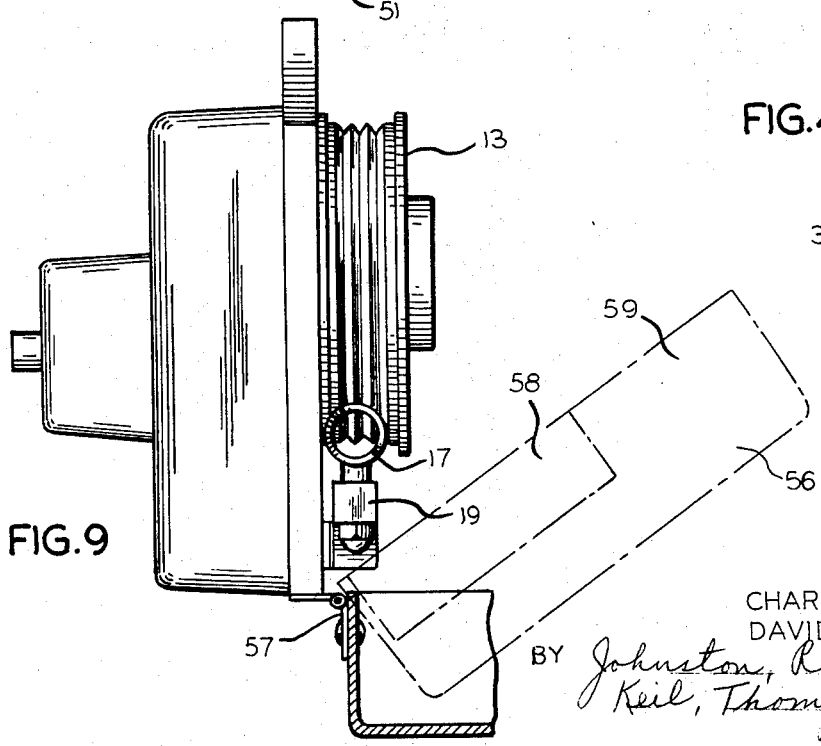
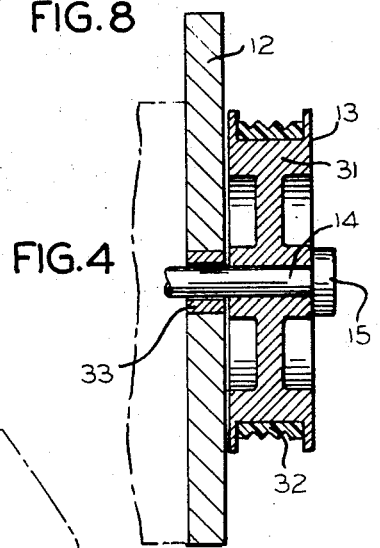

ROVING COUNTER AND BRAKE

This invention relates to braking systems for roving and, more particularly, to braking systems responsive to roving tension.

BACKGROUND OF INVENTION

In manufacturing fiberglass reinforced products, certain operations require the formation and spraying of a mixture of plastic resins and chopped fiberglass. Sophisticated spraying means are utilized which mix the resin and chopped fiberglass in desired proportions. Resin pumps are employed to transmit the resin to a spray gun. The fiberglass is usually chopped or cut by a device attached to the spray gun and is drawn into the chopper or cutter in the form of roving. The roving consists of many strands of fiberglass material and is supplied to the cutter from a roving ball or other feed means. Operation of the spray gun simultaneously activates the roving cutter in most systems. The spray guns and cutters are hand operated, but are supported by a boom. The roving often is carried in guides positioned along the boom between the feed source and the spray gun. When the spray gun is operated, the roving is drawn from the feed source at a fairly rapid rate. When the gun is shut off, however, the inertia of the roving allows it to "coast" for awhile. Consequently, the roving has a tendency to fall onto or around the operator. This, in general, causes inconvenience and loss of time.

It is also desirable to know how much roving has been used by the operator. This allows a more precise control over the mixture of chopped fiberglass and resin being sprayed.

It is therefore an object of this invention to provide a device for automatically braking the roving when the spray gun is shut off.

Another object of the present invention is to provide an accurate means for measuring the amount of roving which has been used by the operator.

Other objects of the invention will become apparent to those skilled in the art from the following detailed description of the invention.

BRIEF DESCRIPTION OF THE INVENTION

In general, the present invention consists of a device for restricting the movement of roving in response to the tension on the roving. The device is utilized, in general, between a feed source for the roving and the apparatus which is to use the roving, generally, the chopper attached to a spray gun. In a preferred embodiment of the invention, the subject device comprises a base plate and mounted thereon an input guide, a rotatable wheel, and a pivotally mounted L-shaped lever arm. At one end of the lever arm is an output guide member. Mounted at the other end of the lever arm is a movable pawl. The pawl is disposed to engage the wheel in response to the position of the lever arm. A spring located on the lever arm is arranged to urge the pawl resiliently toward the wheel.

DETAILED DESCRIPTION OF THE INVENTION

Under normal operating conditions, roving is drawn from a roving ball or similar feed source through intermediate guide members and fed into the input guide. It is then passed between the wheel and the pawl, through the output guide member located at the end of the pivotally mounted lever arm, and after passing through various other intermediate guide members, terminates at the cutting device. When the spray gun and chopper are operated, tension is placed on the roving. The output guide member located at the end of the pivotally mounted lever arm is positioned generally below the other intermediate guide members and hence when tension is applied to the roving, the output guide member and the lever arm are raised. When the lever arm is raised, the pawl disengages from the wheel. Inasmuch as the roving passes between the wheel and the pawl, the roving is free to move when the pawl disengages from the wheel. The pawl, however, continues to be urged resiliently toward the wheel. Thus, the pawl will hold the roving against the wheel, but not restrict movement of either. The pawl serves another equally vital function. Common practice in the use of the system involves joining two or more roving balls. To insure a continuous operation, the ends of the balls are tied together with common knots. The spring loaded pawl allows free passage of such knots through the device and prevents a premature application of the braking action carried by the knots. As the roving moves through the device, the wheel rotates in proportion to the amount of roving being used. A counter is attached to the wheel to accurately measure the amount of roving passing through the chopper.

When the spray gun and chopper are shut off, roving will no longer be drawn into the chopper and consequently, tension on the roving will be released. As a result, the output guide member and the lever arm will be released to a lower position. When the lever arm is allowed to assume this lower position, the pawl will engage the wheel and restrict further movement of either the wheel and the roving. Thus the roving will not be allowed to coast after the chopper is shut off.

DESCRIPTION OF THE DRAWINGS

The invention can be more fully understood by reference to the attached drawings in which:

FIG. 4 is a side sectional view of the wheel used in the roving counter and brake.

FIG. 6 is an end sectional view of the pawl.

FIG. 7 is a section view taken along lines 7—7 in FIG. 6.

FIG. 8 is a perspective view, partially exploded, of the front side of the roving counter.

FIG. 9 is a partial end view of the roving counter and brake showing the rear cover and hinge.

DESCRIPTION OF PREFERRED EMBODIMENT

Figure 1:
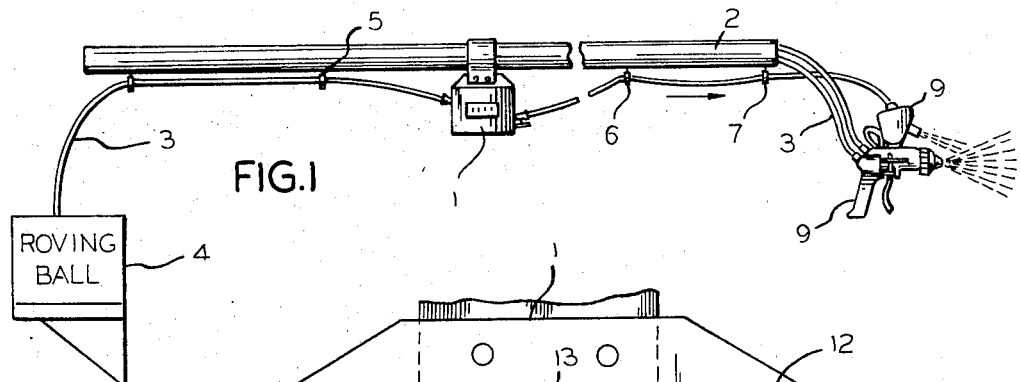
FIG. 1 is a plan view showing the roving counter and brake attached to a boom and being utilized in connection with a chopper and spray gun.

In the preferred embodiment of the subject invention, the roving counter and brake 1 is shown in FIG. 1 attached to boom 2. Roving 3 is unreeled from reel 4 and passes through guide 5, thence into and through roving counter and brake 1, through guides 6 and 7 and into chopper 9. The chopped roving is mixed in the air with resin and catalyst which pass from tubes 10 and 11 through the spray gun and the mixture is sprayed onto a work surface (not shown). As will be described in connection with subsequent figures, roving counter and brake 1 permits the passage of roving when roving is being used by the chopper 9, but restrains passage of roving when none is being demanded by the chopper.

Figure 2:
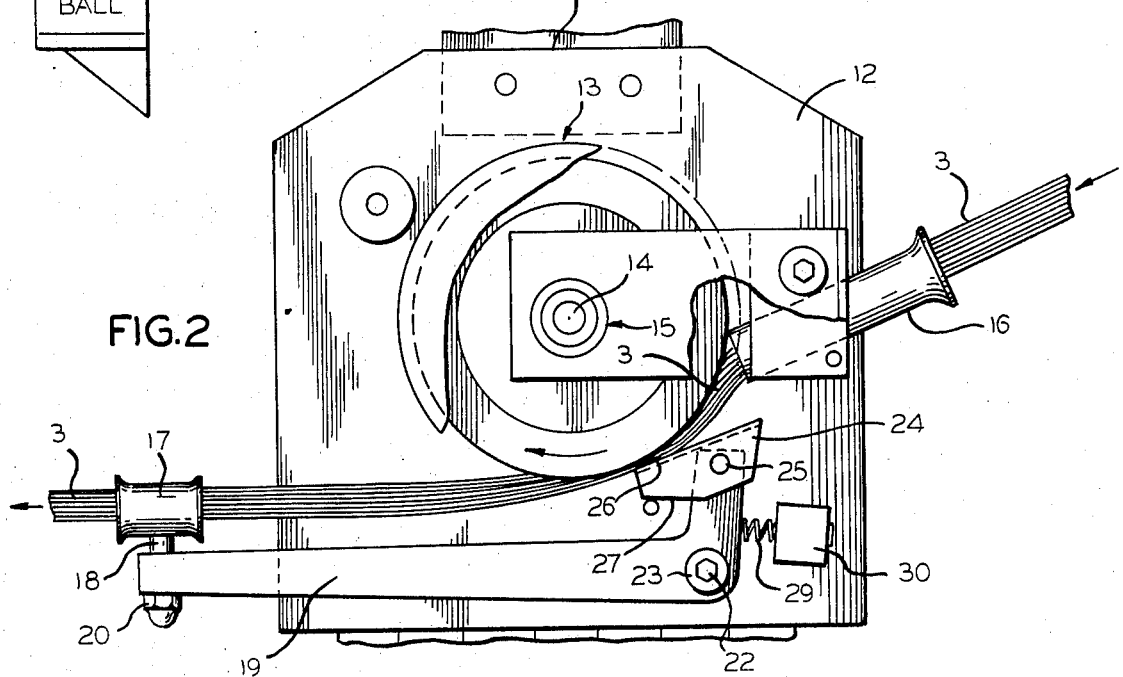
FIG. 2 is a plan view of the rear side of the roving counter and brake.

FIG. 2 is a plan view of the rear side of roving counter and brake 1 showing mounting plate 12. Brake wheel 13 is shown mounted on axle 14 and retained thereon by bushing 15. Axle 14 passes freely and rotatably through mounting plate 12 and engages a conventional counter which will be described in connection with a later figure. In its contemplated application, roving 3 enters the roving counter and brake 1 through tubular guide 16, engages wheel 13 as shown and exits via tubular guide 17. Tubular guide 17 has a threaded lower end 18 which passes through L-shaped lever arm 19 and is secured thereon by nut 20. Guide 16 is securely mounted in and passes through guide mounting block 21. Guide mounting block 21 is fastened, by means of screws (not shown), to mounting plate 12. Lever arm 19 is rotatably mounted on threaded pin 22 and is retained on pin 22 by means of nut 23. Brake pawl 24 is movably mounted to lever arm 19 by means of pin 25. In FIG. 2, lever arm 19 is shown in its lowered position, that is, the position assumed by lever arm 19 when no roving is being demanded by chopper 9. When lever arm 19 is in the lowered position, the lower surface 27 of pawl 24 engages pin 28 and the upper surface 26 of pawl 24 is urged into engagement with wheel 13 thereby trapping roving 3 therebetween. Pin 28 is attached at substantially right angles to plate 12. Thus with lever arm 19 in the lowered position wheel 13 is braked by surface 26 at pawl 24, and roving 3 is restrained between pawl 24 and wheel 13 from moving in either direction. Coil spring 29 is disposed as shown between lever arm 19 and spring keeper 30. Coil spring 29 is provided to resiliently urge lever arm 19 into the lowered position as shown in FIG. 2. Spring keeper 30 will be described in connection with FIG. 5.

Figure 3:
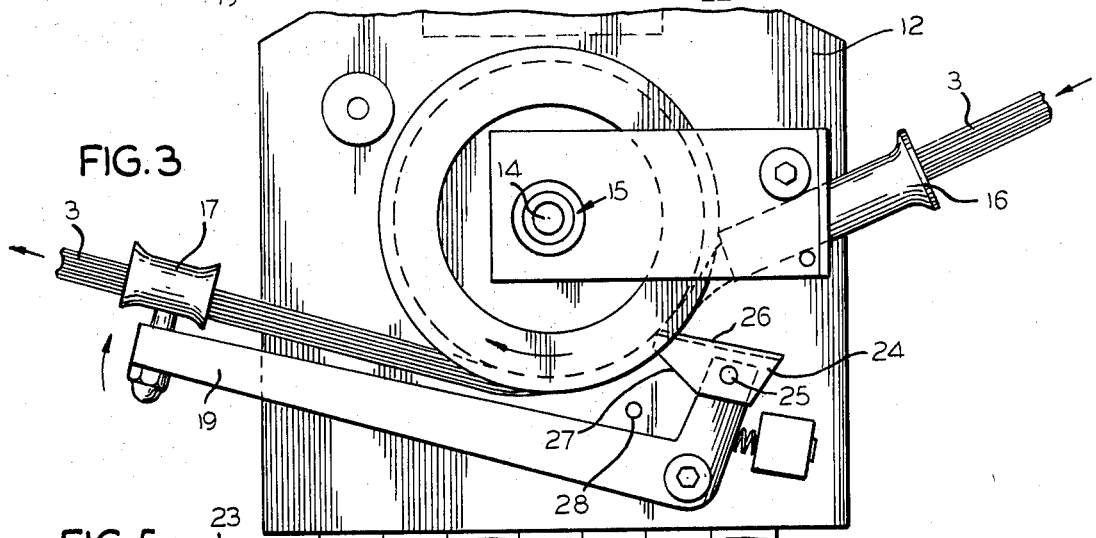
FIG. 3 is a plan view of the rear side of the roving counter and brake showing the lever arm in the raised position.

FIG. 3 is a plan view of the rear side of the roving counter and brake 1 showing the lever arm 19 in the raised position. When chopper 9 is operated, tension is applied to roving 3 thereby drawing roving off reel 4. In addition, the tension applied to roving 3 will tend to raise lever arm 19 to the position shown in FIG. 3. This occurs because guide 17 is located generally below guides 5 and 6 on boom 2 as indicated in FIG. 1. When the spray gun and chopper are not being used, roving is not being drawn off reel 2 and there is little tension in roving 3, thus allowing lever arm 19 to fall to the lowered position described in connection with FIG. 2. Conversely, when tension is applied to roving 3, as the chopper is operated, lever arm 19 will be lifted to the position shown in FIG. 3. The upward movement of lever arm 19 is restrained as shown by pin 28. When lever arm 19 is in the raised position, the lower surface 27 of pawl 24 no longer engages pin 28. The upper surface 26 of pawl 24 remains resiliently urged against wheel 13 by means of a spring (described in connection with FIG. 6) mounted on pin 25. The pressure of pawl 24 against wheel 13 does not inhibit the passage of roving 3, but merely ensures that roving 3 will engage wheel 13, thereby rotating wheel 13 and axle 14. The number of rotations of wheel 13 and axle 14 will be directly proportional to the quantity of roving 3 passing through the roving counter and brake. Inasmuch as axle 14 engages a conventional counter (described in connection with FIG. 8), the information shown on the face of the counter will bear a direct relationship to the quantity of roving passing through the roving counter and brake.

FIG. 4 is a side sectional view of wheel 13 showing rim 31 and tire 32. Rim 31 is rigidly mounted on axle 14 and retained thereon by bushing 15. Rim 31 and axle 14 are arranged to mount rotatably in bearing 33. Bearing 33 is mounted in mounting plate 12. Tire 32 is utilized to achieve better frictional engagement with roving 3 and pawl 24.

Figure 5:
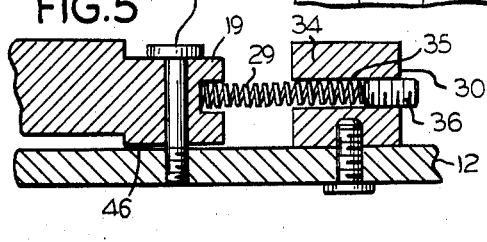
FIG. 5 is a side view, partially in section, showing the positioning of the coil spring disposed between the lever arm and the spring keeper.

FIG. 5 is a side view, partially in section, showing the positioning of spring 29 between lever arm 19 and spring keeper 30. Spring keeper 30 is shown mounted on plate 12. Block 34 includes bore 35 arranged to receive spring 29. One end of bore 35 is threaded to receive spring tension adjusting screw 36. Block 34 is fastened to plate 12 by means of bolts 37. The left end of spring 29 is shown residing in bore 38 of lever arm 19. The right end of spring 29 is shown residing in bore 35. Lever arm 19 is shown pivotally mounted on threaded pin 22 and retained on pin 22 by means of nut 23. Pin 22 is firmly mounted in plate 12 by means of threaded connection 39.

Boss 46 on the lower side of lever arm 19 is provided so that lever arm 19 may move freely without interference with plate 12.

FIG. 6 is an end sectional view of pawl 24 showing the position of spring 40. FIG. 7 is a section view taken along lines 7-7 in FIG. 6 also showing spring 40. In FIGS. 6 and 7, spring 40 is shown mounted on axle 25 and disposed within a channel 41 located in the upper end of lever arm 19. One end 42 of spring 40 bears against surface 43 of pawl 24. The other end 44 of spring 40 bears against surface 45 of lever arm 19. The function of spring 40 is to resiliently urge pawl 24 toward wheel 13 and away from lever arm 19.

FIG. 8 is a partially exploded perspective view of the front side of the roving counter and brake. Axle 14 is shown protruding through bearing 33 in plate 12. Axle 14 is connected to conventional counter 47 by means provided with counter 47. Counter 47 is affixed to plate 12 by means of screws 48. Cover plate 49, which is shown with opening 50 for counter 47, is attached to plate 12 by means of screws 51. Boom clamp 52, provided for attaching the roving cutter and brake 1 to boom 2, is attached to plate 12 by means of screws 53. Bolt 55 is utilized in threaded hole 54 to fasten clamp 52 to boom 2.

FIG. 9 is a partial end view of the roving counter and brake 1 showing rear cover 56. Cover 56 is connected to plate 12 by means of hinge 57. An opening 58 is cut into the side of the cover 56 to allow guide 17 and lever arm 19 to protrude through the cover. A second opening 59, shown dotted, is cut into the side of cover 56 opposite opening 58, to allow guide 16 to protrude through the cover. Cover 56 may be held in the closed position by either magnetic or other conventional means.

In use, the roving counter and brake 1 is suspended from boom 2 by means of clamp 52. Roving 3 is fed via guide 5 through guide 16, between wheel 13 and pawl 24, thence through guide 17, into guides 6 and 7 and terminates in chopper 9. When chopper 9 is operated, tension is placed on roving 3 and lever arm 19 rises, thus permitting roving to pass freely through roving counter and brake 1. As the roving passes through roving counter and brake 1, counter 47 reisters the quantity of roving which passes. When chopper 9 becomes inactive, tension is released from roving 3. Consequently, lever arm 19 drops to its lowered position, thus clamping the roving between wheel 13 and pawl 24 preventing rotation of wheel 13. Thus, the roving will not "coast" after the chopper is shut off. With the roving thus held, it will not, as in the past, fall onto and around the operator of the spray gun. As was pointed out above, the spring loaded pawl allows the free passage of knots joining one ball to the next through the device.

It should also be clear that if the counter 47 is not desired as an element of the present invention, wheel 13 can be replaced with a fixed element such as a pin or rod. Thus when lever arm 19 is in the lowered position, pawl 24 will urge the roving against the fixed element rather than against wheel 13 as in the preferred embodiment.

While the foregoing description has referred to a specific embodiment of the invention, it will be apparent that many modifications and variations may be made therein without departing from the spirit and scope of the invention.

I claim:

1. A braking system for roving comprising a base, means for feeding said roving continuously through a plurality of spaced tubular guide means, brake means comprising a first member intermediately disposed in the space between said guide means on one side of the path of said roving adapted to contact one side of said roving during its passage between said guide means, a second member comprising a pivoted pawl and restraining means for said pawl mounted on the opposite side of said path adapted to contact the opposite side of said roving during its passage between said guide means, said first and second members being movable with respect to one another to exert a braking action on the movement of said roving in response to a reduction in tension on said roving as it passes through said guide means, and means to cause one of said members automatically to move toward the other when said tension is reduced, said second member further comprising a lever arm pivotally mounted on said base, said lever arm being capable of assuming a raised and a lowered position, said raised position being achieved only when tension is applied to said roving, said lowered position being achieved when no tension is applied to the roving, said pawl being pivotally mounted on one end of said lever arm, said restraining means being mounted on said base to restrain the movement of said pawl, said roving being arranged to pass between said pawl and said first member, said pawl being arranged to contact said restraining means and to restrictively urge said roving against said first member when said lever arm is in the lowered position.

2. A braking system as claimed in claim 1 in which said means to cause one of said members automatically to move toward the other includes resilient means.

3. A system as claimed in claim 1 in which said first member is a wheel fixed to a rotatable shaft which in turn is drivingly connected to means for registering the quantity of roving which passes.

4. A system as claimed in claim 1 in which said pawl is mounted on one arm of said lever which comprises two arms intersecting at an angle to one another, the other of said arms containing a tubular guide means, said lever being pivotally mounted at the point of intersection of said arms.

5. A braking system as claimed in claim 1 in which said restraining means also restrains the upward movement of said lever arm.

* * * * *

UNITED STATES PATENT OFFICE
CERTIFICATE OF CORRECTION

Patent No. 3,777,856                     Dated December 11, 1973

Inventor(s) Charles Gardner and David W. Goelz

It is certified that error appears in the above-identified patent and that said Letters Patent are hereby corrected as shown below:

First page, left-hand column, fifth and sixth line,
" 73      Assignee:  Republic Corporation, Los Angeles,
                     Calif.  "
should read
-- 73      Assignee:  Ransburg Electro-Coating Corp.,
                     Indianapolis, Indiana               --.

Column 5, line 2, "reisters" should read -- registers --.

Signed and sealed this 29th day of October 1974.

(SEAL)
Attest:

McCOY M. GIBSON JR.                    C. MARSHALL DANN
Attesting Officer                      Commissioner of Patents